Oct. 14, 1969 W. SCHOTT 3,472,116

DEVICE FOR PRODUCING FREQUENCY INTERVALS
FOR TUNING MUSICAL INSTRUMENTS

Filed March 9, 1967 4 Sheets-Sheet 1

INVENTOR.
WINFRIED SCHOTT
BY
Frank R. Jinifani
AGENT

Oct. 14, 1969 W. SCHOTT 3,472,116

DEVICE FOR PRODUCING FREQUENCY INTERVALS
FOR TUNING MUSICAL INSTRUMENTS

Filed March 9, 1967 4 Sheets-Sheet 2

INVENTOR.
WINFRIED SCHOTT
BY
AGENT

INVENTOR.
WINFRIED SCHOTT
BY
[signature]
AGENT

Oct. 14, 1969 W. SCHOTT 3,472,116

DEVICE FOR PRODUCING FREQUENCY INTERVALS FOR TUNING MUSICAL INSTRUMENTS

Filed March 9, 1967 4 Sheets-Sheet 4

INVENTOR.
WINFRIED SCHOTT
BY
AGENT 3,472,116

DEVICE FOR PRODUCING FREQUENCY INTERVALS FOR TUNING MUSICAL INSTRUMENTS

Winfried Schott, Garstedt, Germany, assignor to U.S. Philips Corporation, New York, N.Y., a corporation of New York Filed Mar. 9, 1967, Ser. No. 621,805
Claims priority, application Germany, Apr. 19, 1966, P 39,223
Int. Cl. G10g *7/02;* G01r *23/14*
U.S. Cl. 84—454 4 Claims

ABSTRACT OF THE DISCLOSURE

An automatic tuning device for tuning a musical instrument and having a variable oscillator, a frequency divider and a comparison circuit, the comparison circuit receiving the divided signal and the actual tone from the instrument to be tuned. The output of the oscillator is coupled to a second frequency divider. A second comparison circuit, responsive to a reference tone and the output of the second divider, is used to indicate the difference between the reference and actual tone.

The invention relates to a device for producing frequency intervals suitable for tuning musical instruments, particularly for tuning on the equi-tempered scale.

Appliances for tuning musical instruments are known. The known appliances supply the twelve tones of an octave, spaced apart from each other by a semi-tone interval and generated by a variable generator or compared by mechanical division of frequencies derived from a fixed number obtained from suitable means (for example oscillographs, stroboscopes) with the frequencies produced by the instrument. It is furthermore known to produce by digital agency musically acceptable intervals by dividing a basic frequency $f_0$ by appropriate integers. Such a method is described in U.S. patent application 497,846 filed Oct. 19, 1965 and assigned to the assignee of the present invention. The output signal of an oscillator O, supplying a frequency $f_0$ which is continuously variable in a ratio of 1:2, is applied to a dividing stage T, the dividing number of which may be changed from $z_1=196$ into $z_2=185$. At the output of this dividing stage are thus optionally available the frequencies $f_1=f_0/z_1$ and $f_2=f_0/z_2$, which frequencies are spaced apart by an equal semi-tone interval, if $f_0$ is constant. The frequency of the tone to be tuned $f_m$ is compared with the output frequency of the divider in the comparison circuit V and the differences are marked in an indicator M. Tuning is performed in the following manner.

(1) Adjustment of the frequency generator to the internal standard frequency of 81.4 kc./s., which may be controlled by a quartz crystal. In the position $z_2=185$ the comparison frequency $f_v=440$ c./s.; this permits the tuning of the *a'* of the instrument concerned. As matter of course, *a'* may be adjusted at any other desired pitch, for example 435 c./s.

(2) Change over to $z_1=196$. The comparison frequency has dropped by a semi-tone. This permits the tuning of the *a* flat'.

(3) Change back to $z_2=185$ and reduction of $f_0$ so that $f_v$ is equal to the just tuned *a* flat'.

(4) Change over to $z_1=196$. Tuning of the *g'*.

(5) Readjustment to $z_2=185$ and reduction of $f_0$ until $f_v$ corresponds to the *g'* just tuned.

(6) Change over to $z_1=196$; tuning of the *f* sharp' etc.

By repeating this process twelve times, all required intervals are obtained and finally the octave tone is found.

The frequency of the sound sources of ordinary musical instruments (for example piano chords) depends, however, intimately upon temperature. Comparatively small temperature fluctuations are capable of changing the absolute pitch of the instrument, while in practice the intervals remain the same in a large temperature range, since all oscillators react to these fluctuations in substantially the same manner. If during the tuning process the temperature varies and if the instrument is tuned by comparison with constant frequencies, audible false intervals are produced. These false intervals also appear in the method described in said patent publication owing to the successive adjustment of the base-frequency generator to the frequency of tuned chord and to the tuning of the next-following chord. It is furthermore troublesome to control all tuning apparatus during the tuning process by hand, so considerable time gets lost and control-errors are unavoidable.

The object of the invention is to provide a tuning apparatus which permits tuning of the conventional musical instruments in a musically perfect way, and tuning errors due to wrong control are prevented.

According to the invention this is achieved by means of a device for producing frequency intervals suitable for tuning musical instruments, particularly for tuning on the equi-tempered scale. The device includes a continuously variable oscillator, a frequency divider and a comparison circuit provided with an indicator, there being provided a second frequency divider controlled by the output signal of the oscillator and having parts differing from those of the first-mentioned frequency divider. A second comparison circuit controls through a control-circuit the frequency of the oscillator, while said second comparison circuit receives on the one hand the signal of the second frequency divider and on the other hand a reference signal from a tone already tuned in the instrument concerned, the frequency of said tone being initially equal to the output frequency of the first frequency divider.

The invention will be described more fully with reference to the following figures.

Figure 1:
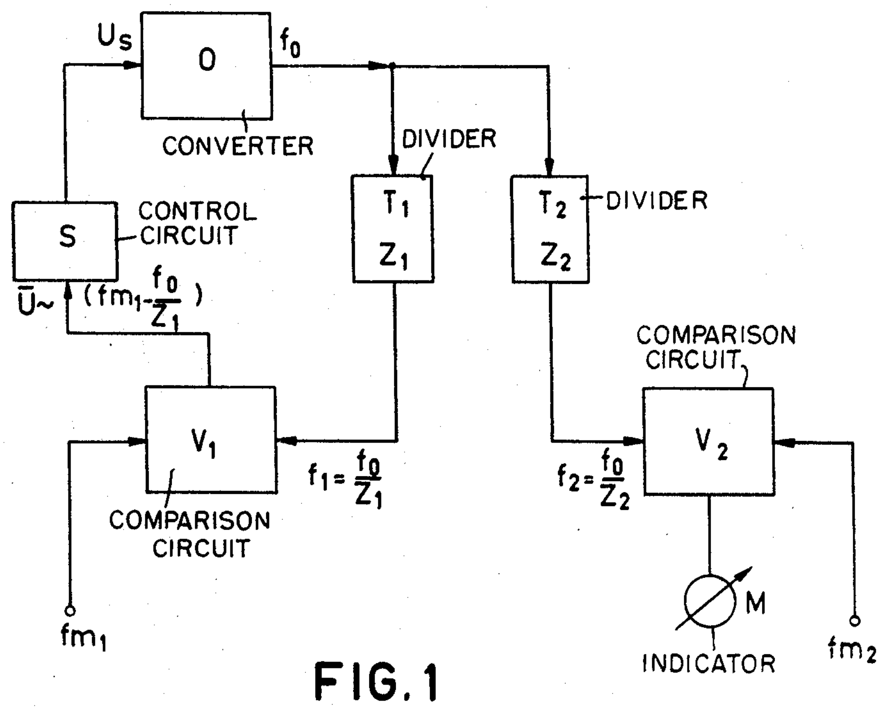
FIG. 1 shows a block diagram of a device for tuning musical instruments according to the invention.

FIG. 1 shows a block diagram of a device for tuning instruments according to the invention. The terminals $f_{m1}$ and $f_{m2}$ continuously receive two frequencies of the instrument to be tuned. $f_{m1}$ is the frequency of a tone already tuned and is compared in a comparison circuit $V_1$ with a frequency $f_0/z_1=f_1$ obtained by means of the divider $T_1$ from the frequency $f_0$. The output signal of this comparison circuit, which is proportional to the difference between $f_{m1}$ and $f_1$, controls the frequency of the oscillator O through a control-circuit S so that the difference becomes zero. $f_0$ is then equal to $f_0=z_1 \cdot f_{m1}$. The frequency $f_0$ is, in addition, applied to a divider $T_2$, so that at the output thereof the frequency $f_0/z_2=f_2$ is available as a reference frequency for the tone to be tuned of the frequency $f_{m2}$. These two signals are compared in the comparison circuit $V_2$, the output of which is connected to an indicator M. If, more particularly, the frequencies $f_{m1}$ and $f_{m2}$ are obtained by means of two interconnected electromechanical converters, spaced apart by a distance equal to the distance between two piano strings differing by a semi-tone, and if $z_1$ is chosen to be 185 and $z_2$ to be equal to 196 or conversely, the manipulations required for tuning the instrument are restricted to a stepwise displacement of the interconnected converters and to tuning of the strings by means of the indicator. Since the oscillator frequency $f_0$ and hence also $f_2$ are controlled by the frequency $f_{m1}$, it is ensured that at a temperature fluctuation affecting not only the frequency $f_{m1}$ but also the frequency of the tone to be tuned ($f_{m2}$) the absolute value of the naturally constant interval of a semi-tone is adapted to the temperature-dependent frequency $f_{m1}$.

Figure 2:
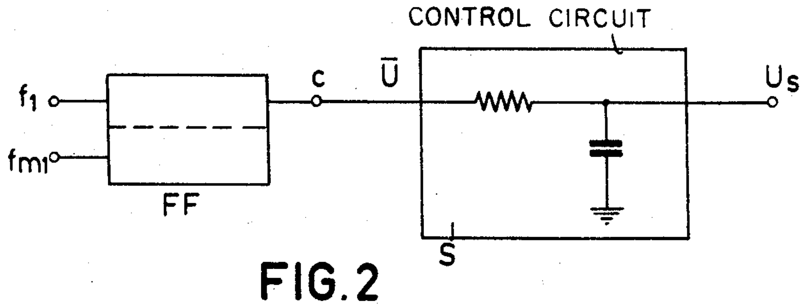
FIG. 2 shows a comparison circuit $V_2$ and a control-circuit S.

FIG. 2 shows a comparison circuit $V_1$ and a control-circuit S. The two frequencies $f_1$ and $f_{m1}$ are applied, subsequent to their conversion into pulses, to the two inputs of a bistable multivibrator FF. If the two frequencies are equal, but if they have a phase shift of a constant angle $\varphi$, a square-wave voltage having the constant pulse width ratio of $\varphi/2\pi-\varphi$ and hence having a constant average value $\overline{U}$ appears at the output of the bistable multivibrator. This voltage is converted in a control-circuit S, formed by a low bandpass filter, into the control-voltage $U_s$. If a small difference appears between the frequencies $f_{m1}$ and $f_1$, the phase relation between these two signals varies and hence the average value of the control-voltage varies in accordance with the polarity of the difference. This voltage variation produces such a variation of the frequency $f_0$ that the frequency difference becomes zero.

Figure 3:
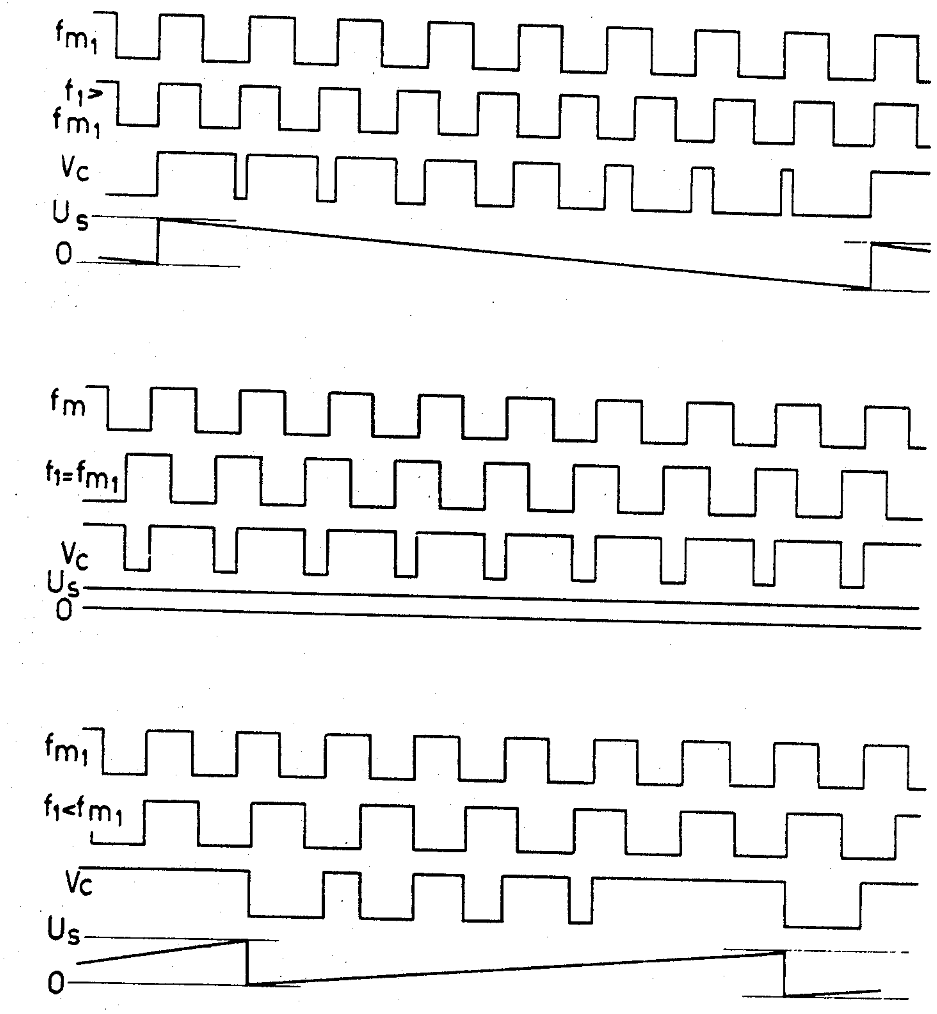
FIG. 3 illustrates the variation of the output voltage as a function of time for a bistable multivibrator used as a comparison circuit and the relevant average value of the voltage with different frequency ratios for $f_1$ and $f_{m1}$.

FIG. 3 shows the output voltage of the bistable multivibrator FF and the average value $\overline{U}$ for several ratios between the frequencies $f_1$ and $f_{m1}$. In order to satisfactorily adjust the frequency $f_{m2}$ to $f_2$, the frequency $f_2$ and hence the frequency $f_0$ should not exhibit a variation which might be produced by the method described for producing the voltage $\overline{U}$. This requirement involves necessarily a low tilting point of the low bandpass filter employed as a control-circuit. This has the disadvantage of a slow control. If the phase angle $\varphi$ between the frequencies $f_{m1}$ and $f_1$ exceeds the value $2\pi$, the average output voltage of the bistable multivibrator jumps from zero to its maximum value or conversely, so that the result of the comparison between the frequencies $f_{m1}$ and $f_1$ is no longer ambiguously determined. This is also the case when the frequency differences are only small and the control-circuit is not capable of varying the frequency $f_0$ sufficiently rapidly owing to its low control-rate. The control-range, that is to say the frequency differences which the control-circuit is capable of dealing with is therefore drastically restricted, so that automatic adjustment of the frequency $f_0$ to the value $z_1 \cdot f_{m1}$ in a larger range is not possible.

Figure 4:
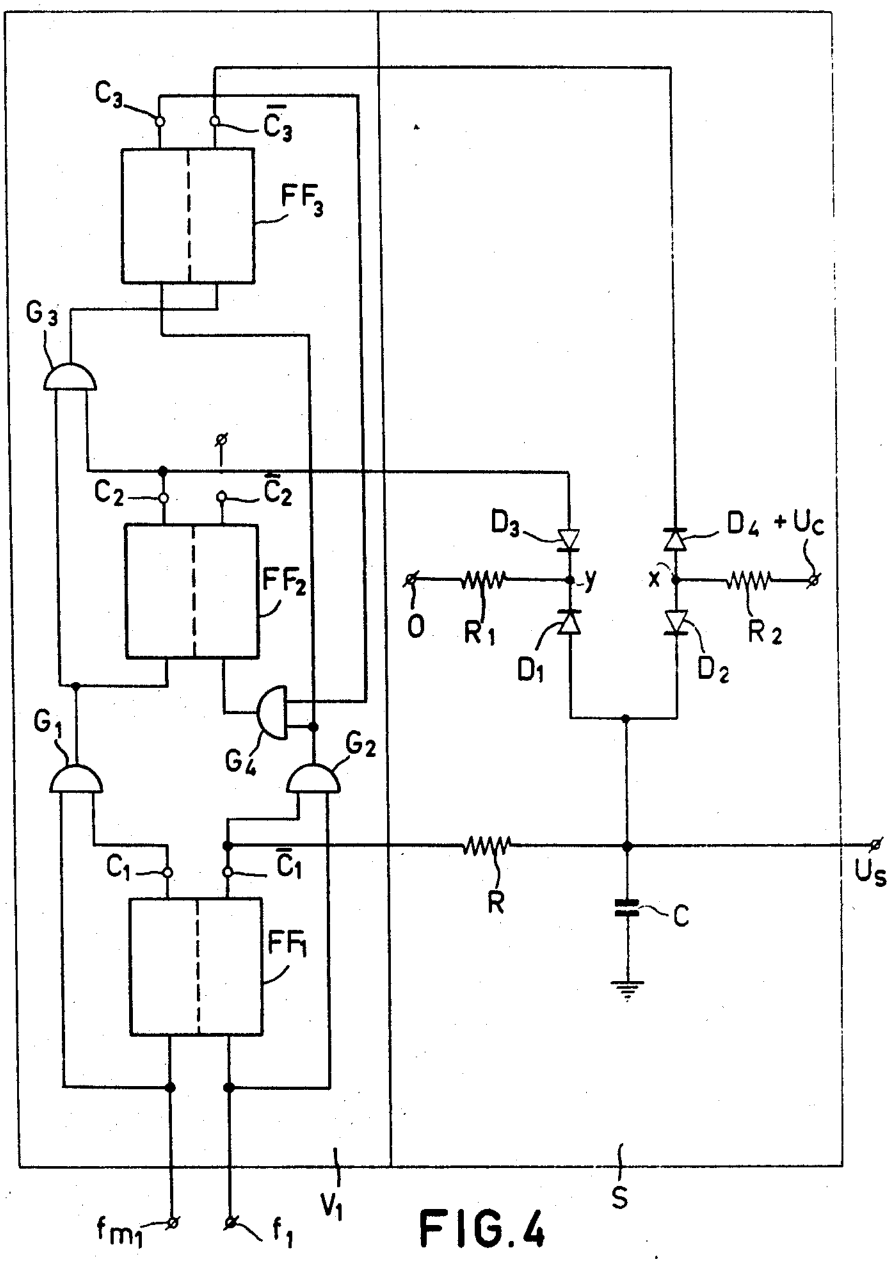
FIG. 4 shows improved comparison and control-circuits according to the invention.

This can be improved by means of the comparison and control-circuits shown in FIG. 4. The bistable multivibrator $FF_1$ for the comparison of the two frequencies $f_{m1}$ and $f_1$ and the low bandpass filter formed by a resistor R and a capacitor C are connected to each other and operate as described above in connection with the block S of FIGURE 2. The comparison circuit $V_1$ comprises two parts to be described separately hereinafter.

(1) A differential gate formed by the distable multivibrator $FF_1$ and the two gates $G_1$ and $G_2$.

(2) A special forward and backward counter formed by the bistable multivibrators $FF_2$ and $FF_3$ and the gates $G_3$ and $G_4$. The two outputs of the multivibrator $FF_1$ control the two multivibrators $FF_2$ and $FF_3$ partly directly ($G_1$ controls $FF_2$ and $G_2$ controls $FF_3$), partly indirectly through the AND-gates $G_3$ and $G_4$ ($G_3$ for $FF_3$; $G_2$ for $FF_2$), which form the connections between the outputs of the directly controlled multivibrators and the outputs of the differential gate.

The two inputs of the differential gate receives positive pulses, whose trailing edges change over the bistable multivibrator $FF_1$ so that the corresponding outputs become positive ($+U_c$). If the frequency $f_{m1}=f_1$, square-wave voltages of the same frequency appear at the outputs of the bistable multivibrator $FF_1$, the pulse width ratio of said voltages depending upon the phase angle between $f_{m1}$ and $f_1$. The gates $G_1$ and $G_2$ remain cut off, since just then a signal appears at the terminal $f_{m1}$, when the output $C_1$ is zero and conversely. The pulses appearing at the outputs of the gates $G_1$ and $G_2$ are applied to the inputs of the forward and backward counter, at whose outputs $C_2$ and $C_3$ appears the positive supply voltage $+U_c$, so that the points $\overline{C}_2$ and $\overline{C}_3$ are at zero voltage. The diodes $D_3$ and $D_4$, controlled by the counter are conducting, so that the point Y is at the voltage $+U_c$. Since point $\overline{C}_3$ is at zero voltage, the voltage at point X is also zero. Therefore, the diodes $D_1$ and $D_2$ are cut off, so that the capacitor C is charged via the resistor R to a voltage $O \leq U_s \leq U_c$, which voltage is determined by the pulse width ratio of the output voltage of the bistable multivibrator $FF_1$. The time constant of charging is $\tau_s=R.C$.

If, for example, the frequency $f_1$ supplied by the oscillator O and divided in the divider $T_1$ is higher than $f_{m1}$ and if the phase angle $\varphi$ exceeds the value $2n\pi$, two pulses will appear consecutively across the input conductor $f_1$ without a pulse appearing between them at the input $f_{m1}$. The second of the consecutive pulses at $f_1$ passes through the AND-gate $G_2$, opened by the first pulse across the multivibrator $FF_1$ and through the AND-gate $G_4$, opened by $C_3$, to the multivibrator $FF_2$, which is thus changed over so that at $C_2$ appears the zero signal=0 volt. At point Y the potential leaps to the value of the capacitor voltage $U_s$; the diode $D_3$ is cut off and the capacitor C is discharged via the diodes $D_1$ and the resistor $R_1$ with a time constant $\tau_E=R_1.C.R_1 \ll R$, so that the discharge is performed more rapidly than across the resistor R, since $\tau_E \ll \tau_S$. This state varies, when the phase angle crosses the value $2n\pi$ in the opposite sense. The two consecutive pulses, appearing at the terminal $f_{m1}$, switch the bistable multivibrator $FF_2$ via the AND-gate $G_1$ to the rest position. The voltage across $C_2$ and hence at the point Y leaps to the value of the positive supply voltage $+U_c$, the diode $D_1$ is cut off and the capacitor C is charged in the opposite sense, now with a time constant $\tau_S \gg \tau_E$.

The arrangement described above is designed so that increasing values of $U_S$ give rise to higher frequencies $f_1$. If oscillator circuits are employed, in which at the frequency $f_1$ the increasing value of $U_S$ becomes lower, the two inputs $f_{m1}$ and $f_1$ have to be interchanged. The polarity of the diodes has then to be inverted with respect to the case in which the "1" signal is represented by a negative voltage at the outputs of the bistable multivibrators. $R_2$ has then to be connected to the voltage $-U_c$.

The arrangement behaves in an analogous way, it being assumed that the rest position $f_{m1} \gg f_1$, so that in order of succession two pulses are applied to the input $f_{m1}$ through the AND-gates $G_1$ and $G_3$, the bistable multivibrator $FF_3$ being changed over, so that at point $C_3$ appears the positive voltage $+U_c$. The voltage at point X then leaps from zero voltage to the voltage $U_s$ and the capacitor C is charged through the diode $D_2$ and the resistor $R_2$. If the frequency $f_1$ has increased sufficiently, the bistable multivibrator $FF_3$ is changed back to the rest position through the AND-gate $G_2$ by two consecutive pulses at the input $f_1$, so that the diode $D_2$ again becomes non-conducting.

Figure 5:
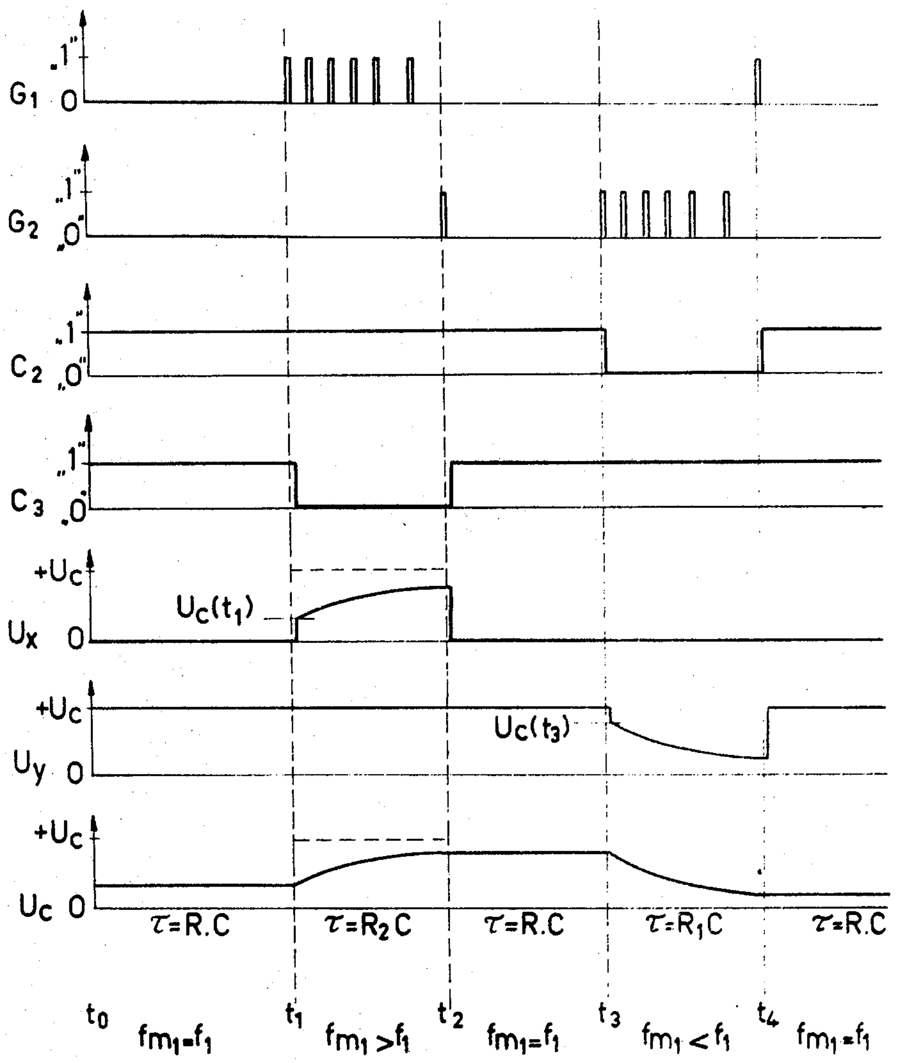
FIG. 5 illustrates the voltages of the various outputs of the circuits of FIG. 4.

FIG. 5 illustrates the voltages at the outputs of the gates $G_1$ and $G_2$ and of the forward and backward counter $C_2$, $C_3$, as well as the voltages $U_x$, $U_y$ and $U_c$. In the cases described above in which the period of time $t_0-t_1 f_{m1}=f_2$, of $t_1-t_2 f_{m1}>f_1$, of $t_2-t_3 f_{m1}=f_2$, of $t_3-t_4 f_{m1}<f_2$ and from $t_4 f_{m1}=f_1$.

I claim:

1. A device for producing frequency intervals suitable for tuning musical instruments comprising a continuously variable oscillator for supplying tuning frequencies, a first frequency divider coupled to the output of said oscillator for obtaining a first tuning frequency, a comparison circuit coupled to said frequency divider and a first reference signal representing a tone to be tuned for comparing said first tuning frequency with said first reference signal, said comparison circuit including an indicator for indicating the difference between said first tuning frequency and said first reference signal, a second frequency divider coupled to said oscillator for obtaining a second tuning frequency, said second divider having a dividing integer which differs from that of the first frequency divider, a second comparison circuit coupled to said second frequency divider and a second reference signal representing a tone already tuned for comparing said second tuning frequency with said second reference signal, the frequency of said second reference signal being initially equal to the output frequency of the first frequency divider, and a control circuit coupled to the output of the second comparison circuit for controlling the frequency of said oscillator.

2. A device as claimed in claim 1, wherein the second comparison circuit comprises a bistable multivibrator having a first input to which said second tuning frequency is supplied and a second input to which the second reference signal is supplied, the output of said bistable multivibrator being connected to said control-circuit, said control-circut including a low-pass filter to pass only the difference frequency of said second tuning frequency and said second reference signal.

3. A device as claimed in claim 2, wherein the comparison circuit comprises a first bistable multivibrator having a first input coupled to and controlled by the reference signal of the instrument to be tuned and having a second input coupled to and controlled by the second frequency divider, a second and a third bistable multivibrator, the first input of the second multivibrator being coupled to and controlled by the output of a first AND-gate, said AND-gate responsive to both the signal of the first output of the first multivibrator and the reference signal, the second input of said second multivibrator being coupled to and controlled by the output of a second AND-gate, said second AND-gate responsive to the second output of the first multivibrator and the second frequency divider, in series with a fourth AND-gate having a first input connected to the output of the second AND-gate and a second input connected to the first output of the third multivibrator, the first input of the third multivibrator being connected to the output of the second AND-gate and the second input of said third multivibrator being connected to the output of a third AND-gate, said third AND-gate having a first input connected to the output of the first AND-gate and a second input connected to the first output of the second multivibrator.

4. A device as claimed in claim 3, wherein the control-circuit comprises a capacitor connected to one output of the first bistable multivibrator of the comparison circuit through a resistor, and two diodes connected between the junction of the capacitor and the resistor in opposite senses and a pair of further resistors connected to a zero conductor and a supply voltage respectively, and diodes arranged in opposite senses between the first output of the said second and third bistable multivibrators of the comparison circuit.

References Cited

UNITED STATES PATENTS

| | | | |
|---|---|---|---|
| 2,924,776 | 2/1960 | Peterson | 84—454 X |
| 3,144,802 | 8/1964 | Faber et al. | 84—454 |

RICHARD B. WILKINSON, Primary Examiner

J. F. GONZALES, Assistant Examiner

U.S. Cl. X.R.

324—79